United States Patent
Venkatachary et al.

(10) Patent No.: US 7,426,518 B2
(45) Date of Patent: Sep. 16, 2008

(54) SYSTEM AND METHOD FOR EFFICIENTLY SEARCHING A FORWARDING DATABASE THAT IS SPLIT INTO A BOUNDED NUMBER OF SUB-DATABASES HAVING A BOUNDED SIZE

(75) Inventors: Srinivasan Venkatachary, Sunnyvale, CA (US); Pankaj Gupta, Mountain View, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 321 days.

(21) Appl. No.: 10/402,887

(22) Filed: Mar. 28, 2003

(65) Prior Publication Data

US 2004/0193619 A1   Sep. 30, 2004

(51) Int. Cl.
*G06F 17/30* (2006.01)
(52) U.S. Cl. ...................................... 707/101; 707/102
(58) Field of Classification Search .................. 370/392; 707/3, 4, 101–102
See application file for complete search history.

(56) References Cited

U.S. PATENT DOCUMENTS

| | | | |
|---|---|---|---|
| 6,018,524 A * | 1/2000 | Turner et al. ................. | 370/392 |
| 6,154,384 A | 11/2000 | Nataraj et al. | |
| 6,192,051 B1 | 2/2001 | Lipman et al. | |
| 6,215,816 B1 | 4/2001 | Gillespie et al. | |
| 6,223,172 B1 | 4/2001 | Hunter et al. | |
| 6,307,855 B1 | 10/2001 | Hariguchi | |
| 6,374,326 B1 | 4/2002 | Kansal et al. | |
| 6,385,649 B1 | 5/2002 | Draves et al. | |
| 6,546,391 B1 | 4/2003 | Tsuruoka | |
| 6,963,924 B1 * | 11/2005 | Huang et al. ................. | 709/238 |
| 7,249,228 B1 * | 7/2007 | Agarwal et al. ............. | 711/154 |
| 7,266,085 B2 * | 9/2007 | Stine ........................... | 370/252 |
| 7,299,399 B2 * | 11/2007 | Huang ........................ | 714/757 |

(Continued)

OTHER PUBLICATIONS

Venkatachary Srinivasan et al Fast Address lookups using Controlled Prefix Expansion, vol. 17, No. 1 Feb. 1999, pp. 1-40.*

(Continued)

*Primary Examiner*—Yicun Wu
(74) *Attorney, Agent, or Firm*—Shemwell Mahamedi LLP

(57) ABSTRACT

A method, apparatus, and storage medium product are provided for forming a forwarding database, and for using the formed database to more efficiently and quickly route packets of data across a computer network. The forwarding database is arranged into multiple sub-databases. Each sub-database is pointed to by a pointer within a pointer table. When performing a longest-match search of incoming addresses, a longest prefix matching algorithm can be used to find the longest match among specialized "spear prefixes" stored in the pointer table. After the longest spear prefixes are found, the pointer table will direct the next search within a sub-database pointed to by that spear prefix. Another longest-match search can be performed for database prefixes (or simply "prefixes") within the sub-database selected by the pointer. Only the sub-database of interest will, therefore, be searched and all other sub-databases are not accessed. Using a precursor pointer and a sub-database of optimally bounded size and number ensures power consumption be confined only to the sub-database being accessed, and that higher speed lookup operations can be achieved since only the sub-database of interest is being searched.

20 Claims, 6 Drawing Sheets

U.S. PATENT DOCUMENTS 7,313,666 B1 * 12/2007 Saminda De Silva et al. .... 711/173
2002/0089937 A1 7/2002 Venkatachary et al.

OTHER PUBLICATIONS

Chen et al., "A Fast and Scalable IP Lookup Scheme for High-Speed Networks," © 1999 IEEE, pp. 211-218.

Pao et al., "Efficient Hardware Architecture for Fast IP Address Lookup," IEEE INFOCOM 2002, pp. 555-561.

Akhbarizadeh et al., "Reconfigurable Memory Architecture for Scalable IP Forwarding Engines," © IEEE, pp. 432-437.

Yu et al., "Forwarding Engine for Fast Routing Lookups and Updates,"0 1999 Global Telecommunications Conference, pp. 1556-1564.

International Search Report, PCT/US2004/009531, mailed Sep. 2, 2004.

Packet Classification using hierarchical Intelligent Cuttings, Pankaj Gupta and Nick McKeown, Proc. Hot Interconnects VII, Aug. 1999, Stanford University.

Packet Classification on Multiple Fields, Pankj Gupta and Nick McKeown, Proc. Sigcomm, Computer Communication Review, vol. 29, No. 4, pp. 147-160, Sep. 1999 Harvard University.

Lampson et al., "IP Lookup using Multiway and Mulcicolumn Search," Aug. 1997, pp. 1-23.

Gupta, "Algorithms for Routing Lookups and Packet Classification," Dec. 2000, pp. 1-197.

* cited by examiner

SYSTEM AND METHOD FOR EFFICIENTLY SEARCHING A FORWARDING DATABASE THAT IS SPLIT INTO A BOUNDED NUMBER OF SUB-DATABASES HAVING A BOUNDED SIZE

BACKGROUND OF THE INVENTION

1. Field of the Invention

This invention relates to computer networking. More particularly, the invention relates to a forwarding database of a lookup table that is bifurcated into a pre-determined number of sub-databases of pre-determined size, each of which can be selected using a pointer table that chooses the sub-database of interest by performing a longest matching search on spear prefixes stored in the pointer table.

2. Description of the Related Art

The following descriptions and examples are not admitted to be conventional by virtue of their inclusion within this section.

Computer networking is generally recognized as the communication of packets across an interconnected network of computers. One objective of networking is to quickly forward the packets from a source to a destination. Thus, within the network itself may be one or more forwarding devices, herein interchangeably referred to as gateways, bridges, switches, or routers.

A forwarding device typically includes a lookup table. An incoming address can be compared to prefix entries stored within the lookup table. If a match occurs, then the associated packet of information is sent to an appropriate port of the forwarding device. As links of the network change, routing protocols exchange information among the forwarding devices to change the prefix entries within the corresponding lookup tables. This change will modify not only the prefixes within the lookup table, but also the next-hop identifiers pointed to by those prefixes. Thus, routing through the forwarding devices can be changed dynamically as links go down and come back up in various parts of the Internet or Intranet.

Internet Protocol (IP) addresses associated with a packet generally comprise a network field and a host field. The number of bits dedicated to the network and host fields can change in a class-based Internet addressing architecture. With the advent of a classless addressing architecture, referred to as Classless Inter-Domain Routing (CIDR), the boundary between the network field and the host field can vary. In addition to class and classless addressing architectures, there are currently several Internet Protocol versions of IP addressing. For instance, IP version 4 (IPv4) uses a 32-bit addressing prefix, whereas IP version 6 (IPv6) uses a 128-bit addressing prefix. If, for example, IPv4 addressing is used, then the forwarding device might only consider the first 8, 16 or 24 bits of the 32-bit addressing field in determining the next hop.

A popular way to determine the next hop is to use a technique known as longest-matching prefix. In this technique, a 32-bit IP address of, for example, 192.2.8.64 is compared against a prefix entry (hereinafter, "prefix") within the lookup table. The prefix 192.2.0.0/16 has a longer matching prefix than prefix 192.0.0.0/8. This is due primarily to the prefix length in the former being 16 bits, and the prefix length in the latter being only 8 bits. The forwarding device will then consider the first two bytes of 192.2* when determining the next hop address at which to send the packet.

There are many ways to perform a longest-matching prefix comparison. For example, pointers or hashes may be used. A first few bits of a binary sequence can be stored as a pointer within a table. Each pointer entry will not only keep track of the prefixes within that pointer, but also will point to subsequent binary entries needed to complete the longest prefix match. While pointers will point to possibly hundreds of prefixes within sub-databases, many sub-databases are empty or sparse of any matching to incoming addresses. Dividing a database of prefixes using precursor pointers, while heuristic, does not therefore assure that the databases are optimally divided. Moreover, this conventional technique does not provide any worst-case guarantees on a lookup performance.

Another technique used to divide a database may involve use of a tree or trie. There are many different tree configurations. A simple tree is often referred to as a binary tree, with more complex trees being compressed forms of the binary tree. To search for an address within a tree, the search begins at a root node. Extending from the root node, a "1" pointer or a "0" pointer is followed to the next node, or binary bit position, within the tree. If, for example, the address begins with 001*, then the search begins at the root and proceeds downward to each vertex node, beginning along the "0" branch pointer to the next "0" branch pointer, and finally to the "1" branch pointer. The search will continue until a leaf node is reached or a failure occurs. The binary tree can be compressed to enhance the search operation. A Patricia tree is one form of compression used to shorten the length of a branch to having relatively few leaf nodes.

A disadvantage of the techniques mentioned above is that they do not provide any bounds on the size of the sub-database extending out of any pointer. This makes it difficult to provision a given amount of storage on any sub-database, and likewise does not provide any guarantees on power or speed of lookup (beyond the trivial worst-case guarantees on looking up the entire sub-database).

A search could be more optimally implemented if the prefixes within each node or searchable sub-databases are more optimally apportioned. A need, therefore, exists in configuring a special form of searchable database using "spear prefixes" that act as pointers when searched, to point only to the sub-database of interest. The desired apportionment involves placing bounds on the number of prefixes within each sub-database, and bounds on the number of sub-databases within the lookup table. By controlling the number of sub-databases and the sizes of the sub-databases, lookup operations are more deterministic, and worst-case lookup times can be guaranteed. Moreover, the bounded number of sub-databases can be more optimally apportioned to a physical device, such as a memory, with dedicated portions of the memory sized to accommodate a corresponding sub-database. This will lessen the power consumption of the lookup operation since only one sub-database need be accessed during a particular lookup.

SUMMARY OF THE INVENTION

The problems outlined above are in large part solved by a system, method, and memory into which sub-databases can be more optimally apportioned. The number of prefixes within a sub-database is preferably limited to no more than T number of prefixes, with T being chosen according to desired speed and power consumption, and usually much less than the total number of prefixes N within the database. Moreover, the number of sub-databases within the database is directly proportional to N and inversely proportional to T, with the number preferably bounded between N/T and (2N/T)+1.

By apportioning the database into sub-databases, only one sub-database need by searched. The sub-database of interest is selected using a pointer unit, which is alternatively known as a splitting engine. The splitting engine includes a pointer table that stores a set of pointers. Each pointer has a corresponding prefix, which is hereinafter referred to as a "spear prefix." The term spear prefix is used to connotes the function of the pointer that is used to spear from a root to a sub-database. Spear prefixes are distinguished from the normal database prefix in that the spear prefixes are special function prefixes uniquely used herein to allow a longest matching spear prefix search to determine the sub-database of interest, as will be described below. For purposes of brevity, the database prefixes associated with N prefixes of the database are hereinafter referred to simply as "prefixes," while the specialized prefixes stored in the pointer table and used by the pointer unit is hereinafter referred to as "spear prefixes."

According to one embodiment, a method is provided. The method is used to form a forwarding database by splitting the database into a number of sub-databases. Given properly bounded sizes and numbers of sub-databases, a set of spear prefix entries and associated pointers can be formed which point to the appropriate sub-database. The pointers not only keep track of the binary string of 1s and 0s from the root node, but also point to the sub-database of interest.

According to another embodiment, another method is provided for locating a prefix in a forwarding database that is split into sub-databases. This method involves using a pointer within, for example, a pointer table and applying a longest match of spear prefixes stored therein. The pointer associated with that longest spear prefix can then be used to point to a selected sub-database within the forwarding database. A longest match of database prefixes (or simply "prefixes") can then be used to determine a longest prefix within the selected sub-database. Finding the longest spear prefix within the pointer table and the longest prefix within the selected sub-database thereby determines the next hop in which to forward the associated packet of data.

According to yet another embodiment, a forwarding device having a computer readable storage medium is contemplated. The storage medium may contain a splitting program, a pointer table, and a lookup table. The splitting program can be called upon by the processor to form a tree having branches extending from a root node to a plurality of leaf nodes. The program can then form a sub-database at each leaf node having fewer than T prefixes, with the cumulative number of prefixes within the leaf nodes and nodes between the root node and the leaf node being N prefixes. During a search operation, the pointer table is accessed and a pointer is obtained during a search for the address. The pointer table will point to only a portion of a lookup table containing the selected sub-database. Thus, the pointer table can be thought of as corresponding to branches of a binary tree used to "spear" into corresponding sub-databases, which can be thought of as the leaf nodes of the binary tree.

BRIEF DESCRIPTION OF THE DRAWINGS

Other objects and advantages of the invention will become apparent upon reading the following detailed description and upon reference to the accompanying drawings in which.

Figure 1:
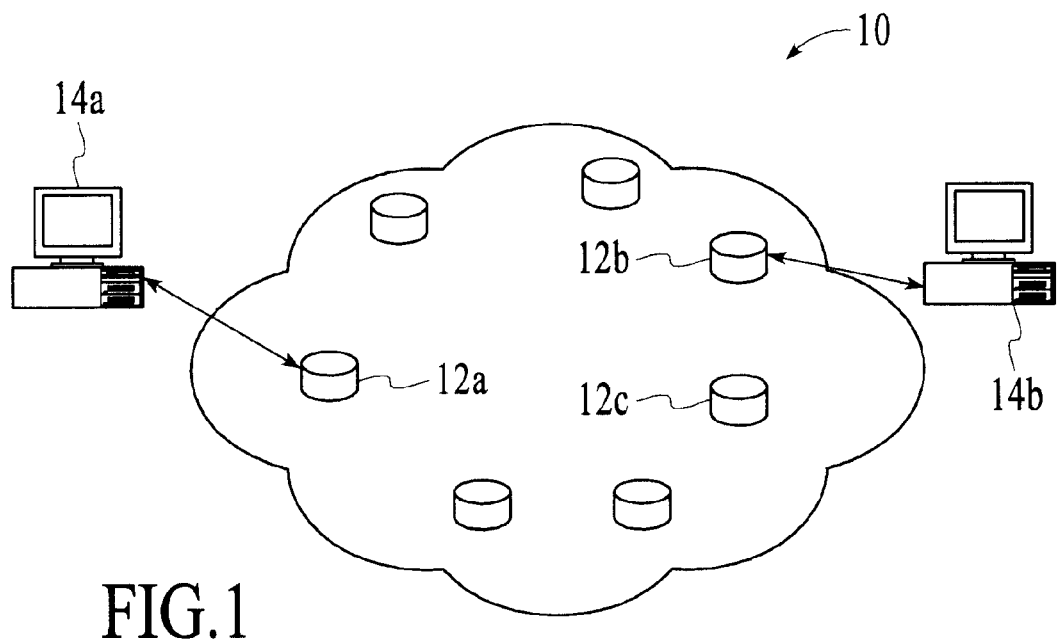
FIG. 1 is a plan diagram of a communication network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

A method, apparatus, and memory product for forming a more efficient forwarding database and using that database to perform a longest-prefix match are described. A forwarding device may more quickly forward packets of data since the longest-match search for the most appropriate prefix in the forwarding database is performed within sub-databases, each having relatively the same size (i.e., number of prefixes). The longest-match search, therefore, occurs only in one sub-database rather than in all sub-databases. The selected sub-database is the result of performing a longest-match search of specialized spear prefixes within a pointer table. The spear prefixes being substantially smaller in number than the database prefixes (or simply "prefixes"), a relatively few binary 1s and 0s need be searched in the pointer table. Once a longest spear prefix match is determined in the pointer table, finding the most appropriate entry in the forwarding database by using only one sub-database substantially accelerates the search process.

FIG. 1 illustrates possibly numerous forwarding devices 12 within a computer network 10. The topology of the Internet or the Intranet interposed between computers 14 can vary. If computer 14a wishes to send a packet of data to computer 14b, then it must do so by traversing one or more forwarding devices 12 within network 10. Forwarding device 12a might receive the packet, which includes a destination address of, for example, forwarding device 12b (or computer 14b). Determining where to send the packet within network 10 so that the packet arrives at a forwarding device (or hop) closer to the destination, is essentially the function of the lookup table within the forwarding device 12a. Optimally, the lookup table within 12a will receive the destination address, and will compare that address or key to prefixes within the lookup table. Associated with each prefix might be a next hop identifier. Thus, once a prefix matches using, for example, the longest prefix match comparison, with the destination address, then the packet is routed to the next hop, closer to the destination.

Figure 2:
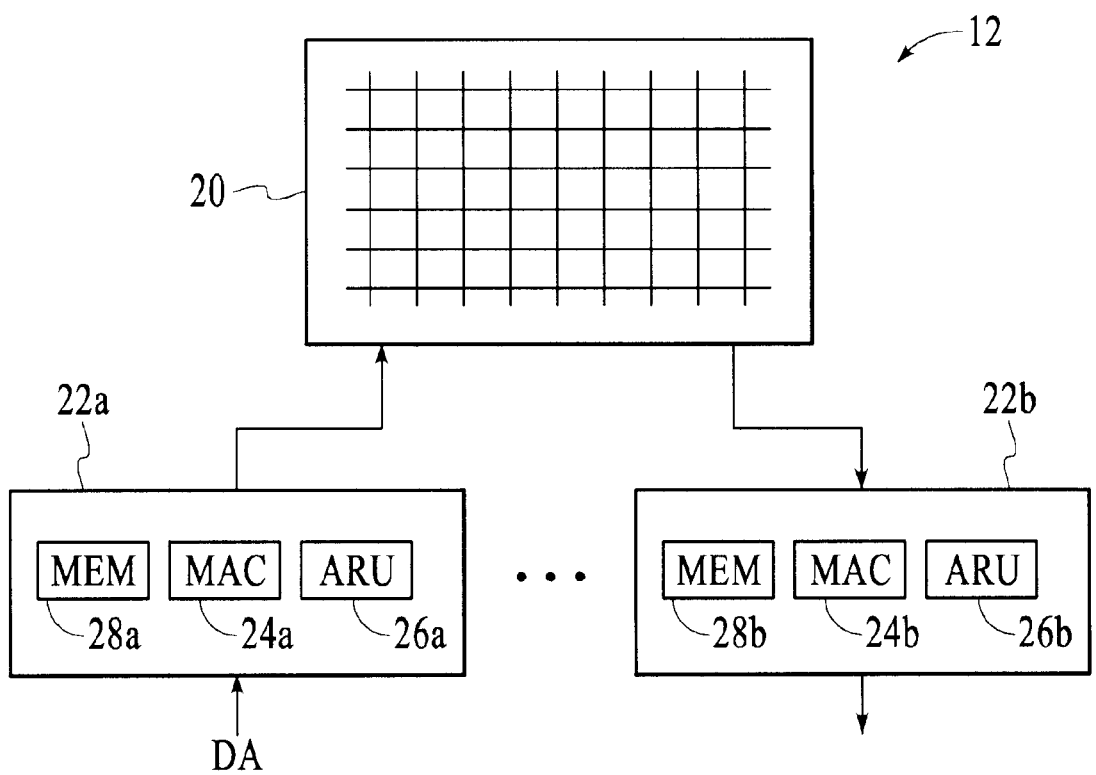
FIG. 2 is a block diagram of a packet-forwarding engine (e.g., switch or router) within the communication network of FIG. 1.

FIG. 2 illustrates one example of a forwarding device 12, such as a router, gateway, bridge, or switch. Forwarding device 12 is often called a packet-forwarding engine and may contain a switching fabric 20, and a plurality of line cards 22. Switching fabric 20 is generally well known, and may involve a crossbar switch that interconnects all the line cards with one another. At least one line card may contain a routing processor. Forwarding device 12 can, therefore, be thought of as performing two functions: (i) performing route lookup based on the destination address of the packet in order to identify an outgoing port; and (ii) switching the packet to the appropriate output port.

The routing function can be performed primarily on the incoming line card (e.g., line card 22a) and the switching of the packet to the appropriate output port or line card can take place within switching fabric 20. The Destination Address (DA) of the packet can enter line card 22a via an I/O interface. Each line card typically includes a Media Access Controller (MAC) 24, an Address Resolution Unit (ARU) 26, and a memory device 28. MAC 24 can be configured to accept many different communication protocols, such as CSMA/CD, FDDI, or ATM communication protocols. As packets are read from ingress MAC 24a, forwarding control information necessary for steering the packet through switching fabric 20 will be prepended and/or appended to those packets.

The ARU 26 at the ingress line card preferably performs the routing function using the longest prefix match comparison technique. The ARU can perform classless or class-based routing functions and can support Variable Length Subnet Masks (VLSM). Each ARU can be reconfigured as routes are added or deleted from the network using well-known routing protocols, such as RIP, OSPF, or BGP. The memory device 28 can be implemented in various types of Random Access Memory (RAM), such as DRAM, SRAM, or Content-Addressable Memory (CAM), a popular form of masking CAM being Ternary CAM (or TCAM). Memory 28 can contain the lookup tables. If the lookup tables are placed within the line card 22, lookups on the incoming packet can be performed locally, without loading the central processor of the forwarding device 12.

Figure 3:
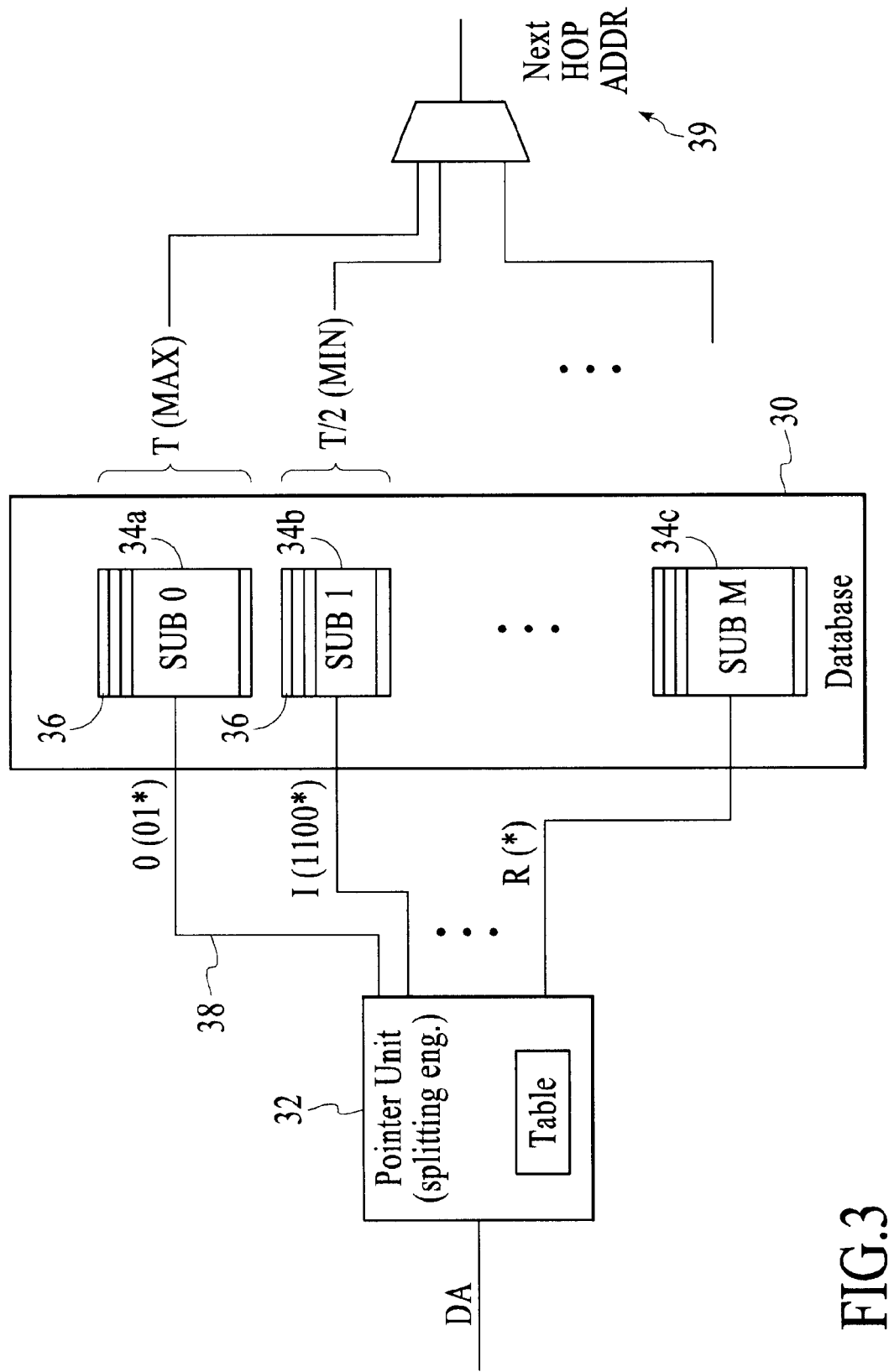
FIG. 3 is a block diagram of pointer unit that points an address to a corresponding sub-database by matching more significant bits of the address to prefixes within the pointer table, and then matching less significant bits of the address to prefixes within the sub-database pointed to by the pointer unit.

FIG. 3 illustrates the configuration or architecture of the overall lookup table. The lookup table can be thought of as the overall forwarding database 30 proceeded by a splitting engine or pointer unit 32. Database 30 is bifurcated or split into a plurality of sub-databases 34. The mechanism used to split database into sub-databases 34 will be described below with regard to FIGS. 5-8. Moreover, an example will be provided to illustrate how the number of prefixes within each sub-database is bounded between a maximum prefix amount, or threshold "T," and a minimum prefix amount, or "T/2." Thus, FIG. 3 illustrates a sub-database 34a that might have a T number of prefixes 36. Sub-database 34b might have a minimum number of prefixes 36. Not only are the number of prefixes within each sub-database controlled, but the number of sub-databases 34 within database 30 is also controlled.

As part of the lookup table, or preceding the lookup table, is pointer unit 32. Pointer unit 32 can include a pointer table having a list of pointers. Each pointer comprises a binary sequence that represents a branch or "spear" to the appropriate unique binary sequence of a corresponding sub-database. For example, one pointer 38 might point to prefix 01*, where * represents a don't care or mask entry. Prefix 01* is a special form of prefix, altogether different from the N number of database prefixes. Prefix 01* is hereinafter referred to as a spear prefix, since it functions to spear into sub-database 34a, in the example shown. If the incoming address (DA) begins with 0 followed by 1, then pointer 38 will point to sub-database "D", which contains a bounded number of prefixes that begin with binary sequence 01, followed by a bounded range of other binary combinations. Another pointer is shown in FIG. 3 as pointer 40 which points to sub-database "I", shown as reference numeral 34b. Sub-database "I" may have a binary sequence beginning with spear prefix 1100, with subsequent binary permutations contained in the number of prefix entries of sub-database "I." The set of pointers represented in the example of FIG. 3 as 01*, 1100*, and * are configured as part of the overall address resolution and are stored within the pointer table of pointer unit 32.

It is appreciated that each of the functional units described in FIGS. 2 and 3 may be implemented with hardwired circuitry, Application Specific Integrated Circuits (ASICs), one or more logic circuits, a processor, or any components of a programmed computer that perform a series of operations dictated by software or firmware, or a combination thereof. Importantly, the present invention is not limited to a particular implementation of the functional units, and thus the functional units can achieve their functionality using either hardware, firmware or software.

Figure 4:
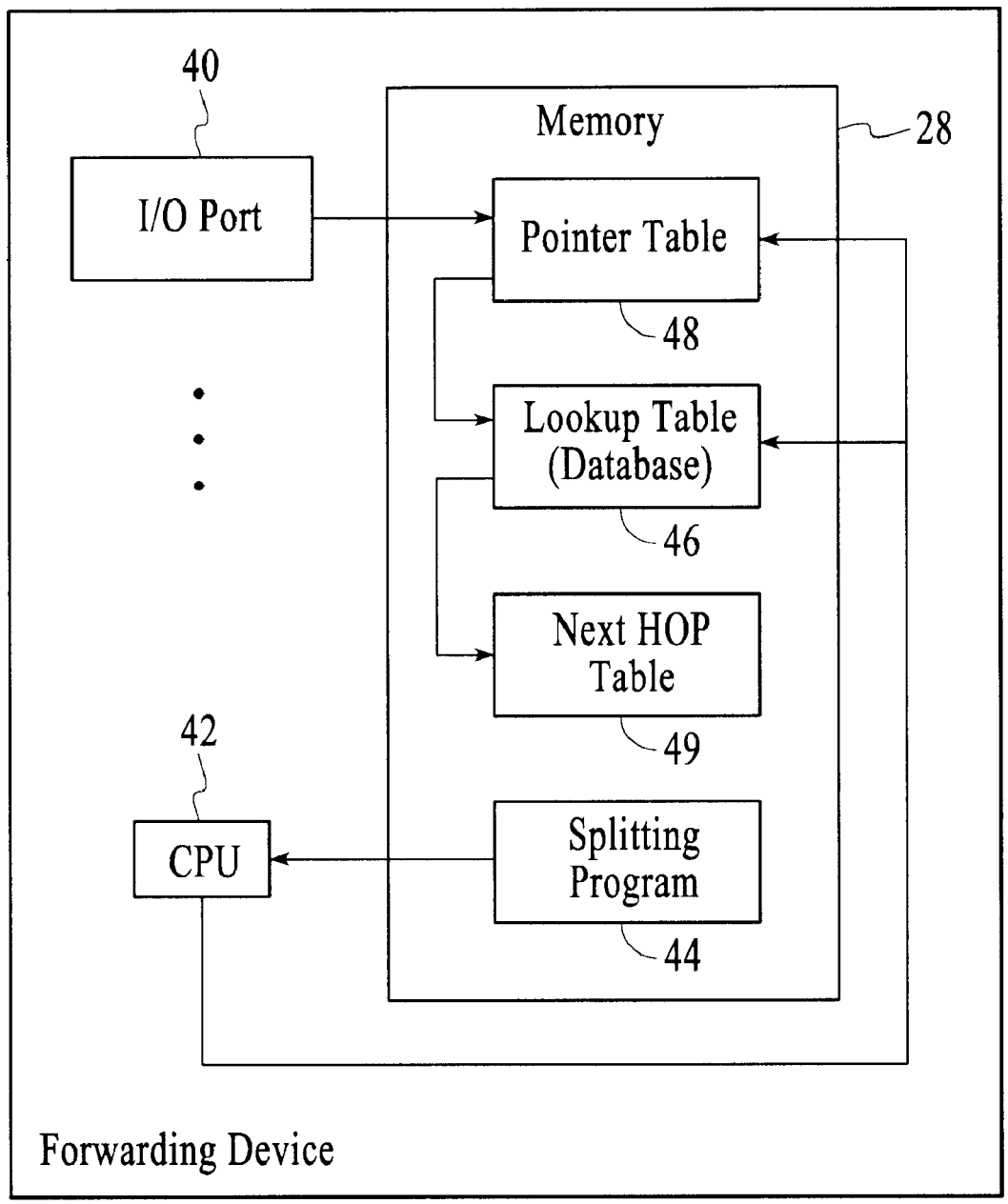
FIG. 4 is a block diagram of a computer storage medium within a router that is used to store a splitting program used by the packet processor to configure the pointer table and the sub-databases within the lookup table of FIG. 3.

FIG. 4 illustrates an exemplary memory allocation within a forwarding device 12. As described in FIG. 2, forwarding device includes multiple input/output ports 40 that communicate with other forwarding devices within the network. The packet processor 42 in the illustrated implementation can be called upon to fetch a splitting program 44 within memory 28. When executed on processor 42, the database of the lookup table is split into sub-databases of bounded size and number. The mechanism by which the database is split will be described below. Once split, processor 42 will configure the sub-databases within lookup table 46 and store the pointers within pointer table 48. When address searching is performed, the incoming address will be sent to pointer table 48 via I/O port 40.

An appropriate pointer will be selected based on a match of the longest prefix within an earlier set of binary bits of that address. That set of bits represents the spear prefix, and the pointer is selected by matching the longest spear prefix within the set of spear prefixes stored in the pointer table. The selected pointer will point, therefore, to an appropriate sub-database within lookup table 46. Another longest prefix match operation will be undertaken to determine the longest matching prefix within only that sub-databases. Once determined, then the longest-matching prefix will point to a corresponding next hop entry. As shown in FIG. 3, the outcome of the lookup operation will be sent to a selector which will then select the next hop identifier recognizable by the switching fabric of FIG. 2. The next hop address selector is shown as reference numeral 39 in FIG. 3, and the next hop table stored in memory 38 is shown as reference numeral 49.

Figure 5:
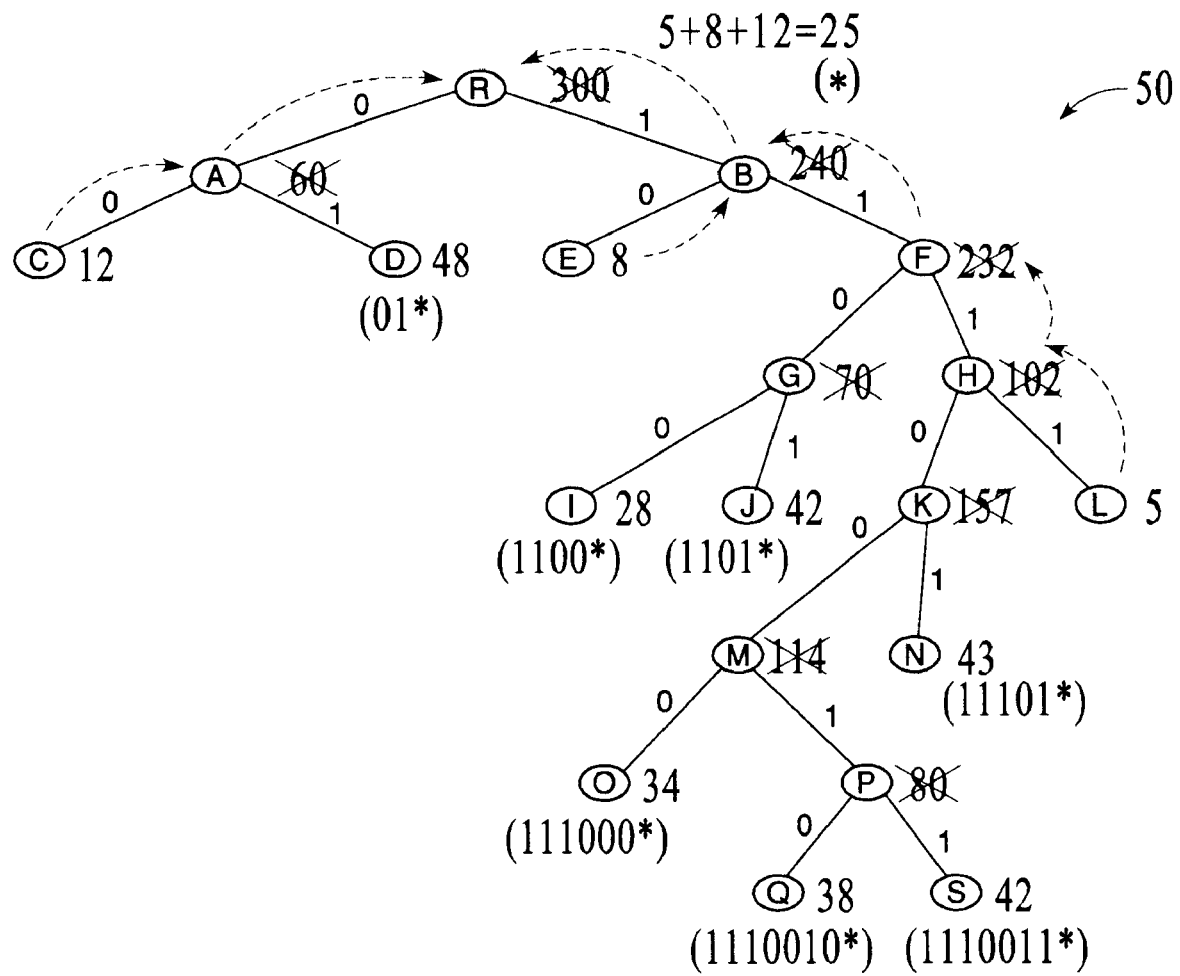
FIG. 5 is a plan diagram of a binary tree having N number of prefixes within a database bounded into no less than N/T sub-databases and no more than (2N/T)+1 sub-databases, with a binary entry pointing to each respective sub-database.

FIG. 5 illustrates how the splitting program 44 (FIG. 4) may utilize a binary tree 50 to generate the pointer entries or spear prefixes, as well as the prefixes within each sub-databases. As shown, the prefix addresses in the forwarding database can be represented in a binary tree data structure 50. Each node or vertex represents a binary string comprising 1s and 0s. The root (R) is the null string represented as an *. Two pointers originate at each node. The first pointer consists of the current binary string plus a 0, and the second pointer consists of the current binary string plus a 1.

In order to bifurcate the forwarding database into bounded sub-databases, an example is provided. In the example shown, the forwarding database may consist of 300 prefixes, alternatively known as N prefixes. Beginning at the null node or root node R of the 300 prefixes, 60 prefixes may begin with 0 in their more significant bit location, and 240 may begin with a binary 1 at the more significant bit location. Thus node A may have 60 prefixes and node B may have 240 prefixes. Since there are no longer any prefixes associated with the root node, the number 300 is canceled by showing an "X" therethrough.

To use a further example, it may be desired to ensure there are no more than 50 prefixes within any sub-database. Therefore, since nodes A and B each contain more than 50 prefixes, both nodes must be further split. Node A prefixes may comprise 12 prefixes associated with the next binary bit having a 0 value and 48 prefixes with the next bit having an associated 1 binary value. Since node D now has no more than T=50 prefixes, node D is said to represent a sub-database and a pointer which points to node D will have a stored binary sequence of 01*. The spear prefixes for node D is therefore 01*, and node D therefore becomes a sub-database since the number of prefixes is less than T and, as will be described below, the number of prefixes is greater than T/2. A masking operation which yields a comparison of 01 at the more significant bit locations will point the address to sub-database D containing 48 prefixes, whereupon an additional longest prefix matching must be performed.

In addition to node A prefixes requiring further bifurcation, node B prefixes must also undergo a split. Eight prefixes may be associated with the next bit value being 0, and 232 prefixes may be associated with the next bit value being 1. Thus, node F must undergo yet further splitting into nodes G and H, as shown. Node G must be further split, as well as node H, since both nodes have more than the maximum number of prefixes (i.e., node G as shown in this example as having 70 prefixes and node H as having 162 prefixes). After further splits, node G produces nodes I and J, where each node may then have fewer than the maximum bounded number of prefixes (i.e., node I is shown having 28 prefixes and node J is shown having 42 prefixes). In order to point to the sub-database at node I and the sub-database at node J, spear prefix pointers must be stored in the pointer table as 1100* and 1101*. Further splitting must occur on node K as shown until nodes are produced having no more than the maximum number of prefix entries, which in this example is 50. Thus, from the 157 prefixes of node K, 34 prefixes can be produced in node O, 38 prefixes in node Q, 42 prefixes in node S, and 43 prefixes in node N.

The nodes that result in prefixes less than the maximum boundary can be thought of as leaf nodes. Thus, the leaf nodes in this example comprise nodes C, D, E, I, J, O, Q, S, N, and L. Not all leaf nodes, however, contain sub-databases. Some leaf nodes may contain a number of prefixes less than a minimum amount. For example, the minimum number of prefixes might be T/2 or, in this example, 25. As shown in FIG. 5, as a result of the splitting program, nodes C, E, and L each have a number of prefixes less than 25.

In order to optimize the longest-matching prefix operation, it is desirable that nodes containing prefixes less than a minimum boundary be merged up the binary chain. As shown, the 12 prefixes within node C can be merged upward to node A. Node A, however, does not contain any prefixes since its prefixes were transferred downward to node C and D. Since node A resulting from the merge operation has fewer than the minimum number of allowable prefixes, an additional merge must be undertaken. An upward merge must again be undertaken from node A to the root node, as shown by the second dashed line. The same merging operation occurs from node E to node B, and from node B to the root node R. The prefixes within node L are also shown merged upward by dashed line to node H, node F, and then node B. If the number of prefixes from node E, combined with the number of prefixes from node L were to exceed 25, then the merge operation would cease at node B. Instead, 8 prefixes within node E and 5 prefixes within node L do not combine to exceed 25 and, thus, must be merged upward to root node R, where they are combined with the 12 prefixes from node C. Although the cumulative number of prefixes merged upward to root node R equals the minimum of 25, even if the cumulative number were less than 25, the root node constitutes an exception to the merge operation. Thus, if fewer than 25 prefixes were merged upward into the root node, no further upward merging need take place from the root node having the null pointer.

Resulting from the split and subsequent merge operations, the binary tree 50 of FIG. 5 produces 8 nodes with bounded sub-databases. The number of prefixes within each sub-database of nodes D, I, J, O, Q, S, N, and R are shown to the right of each node, and the pointer entry within the pointer table which points to that sub-database is shown in parenthesis beneath each node. The 8 sub-databases have no more than T prefixes and no less than T/2 prefixes in the example shown. T can be chosen as any predetermined number depending on the amount of bifurcation needed to optimally perform longest prefix matching. Moreover, the number of sub-databases are chosen not to exceed 2N/T+1, and not to be less than N/T. In the example shown, 2N/T+1=600/50+1, or 13. Furthermore, N/T=300/50, or 6. Since 8 subdirectories were produced, 8 falls within the boundary of 6 to 13.

Figure 6:
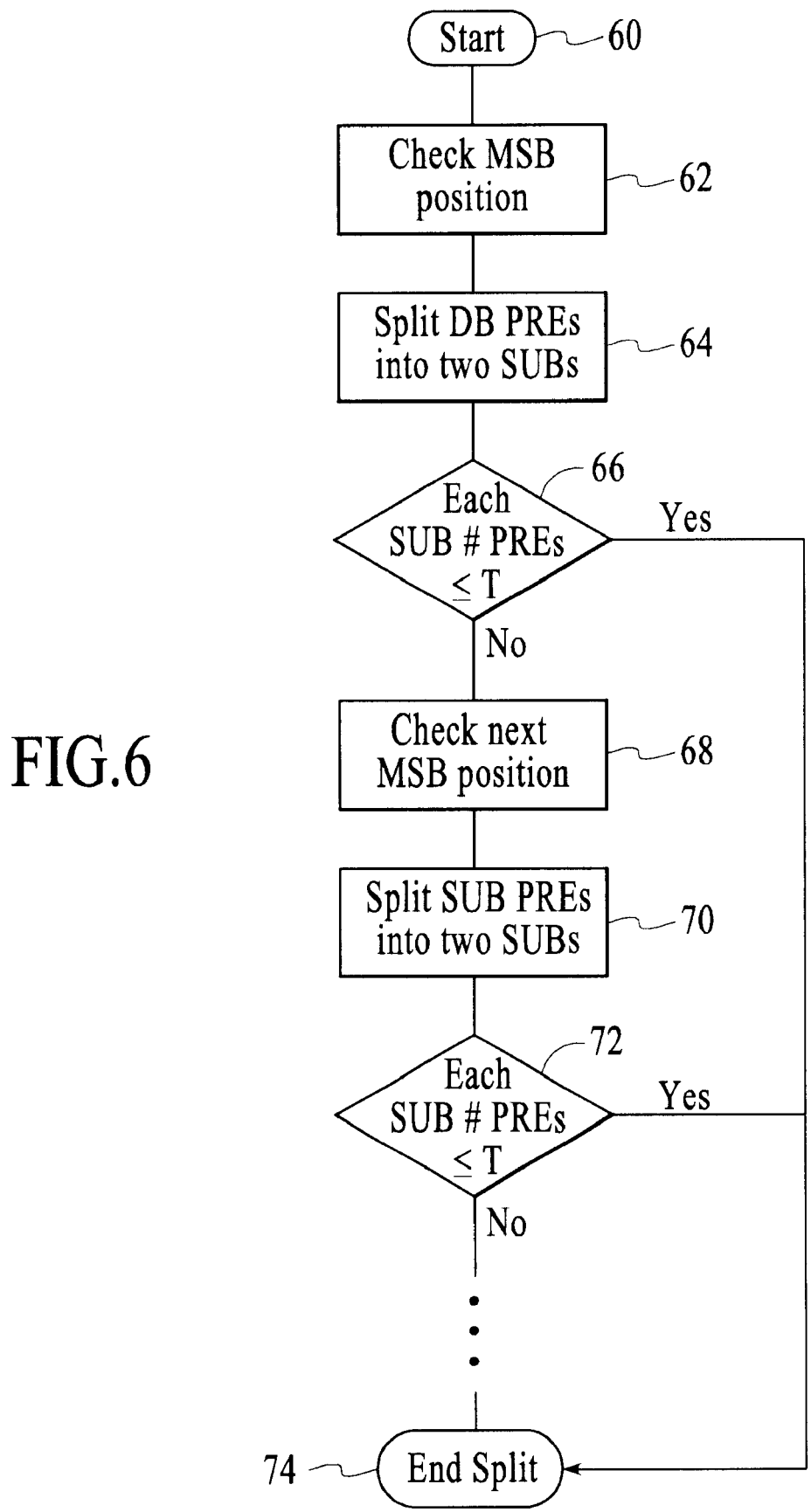
FIG. 6 is a flow diagram of the splitting program used to bifurcate the database into sub-databases having a upper bounded number of prefixes.
Figures 7, 8:
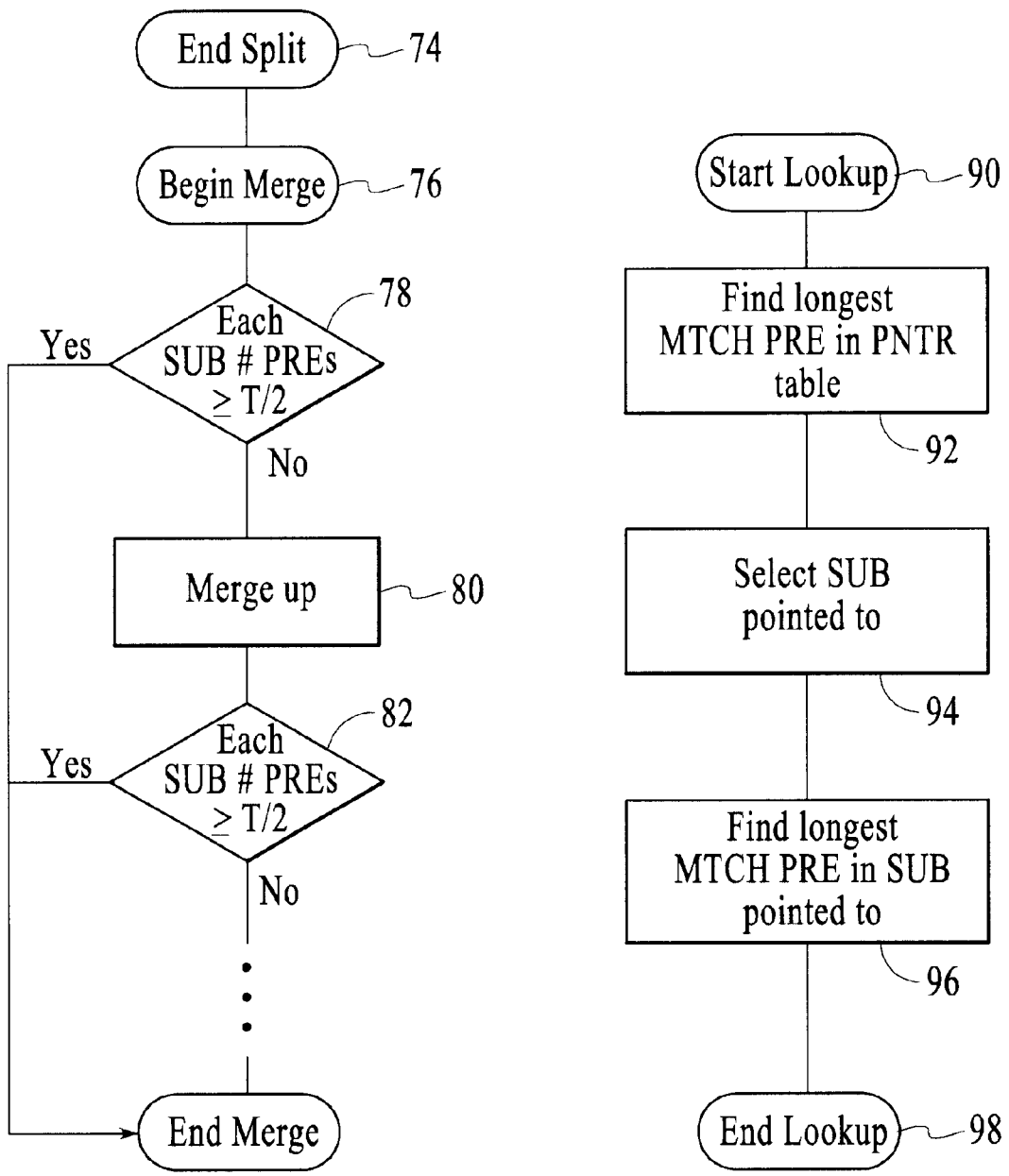
FIG. 7 is a flow diagram of the splitting program used to merge sub-databases up the binary tree if the number of prefixes is less than a lower bounded number of prefixes.
FIG. 8 is a flow diagram of a lookup operation that begins by finding the longest prefix match among the prefixes in the pointer table, selecting the sub-database (or multiple sub-databases) pointed to by the pointer table, and then finding the longest prefix match among prefixes in the selected sub-database (or sub-databases).

Turning now to FIG. 6, further details of the splitting program are shown. FIG. 6 illustrates a sequence of steps used by the splitting program of FIG. 4. Those steps, in particular, depict the splitting phase of the splitting program. FIG. 7 illustrates the merge phase of the splitting program. During a split phase, the splitting program begins at step 60 and descends downward the tree or trie. The value of the more significant bit position is checked in step 62, and the prefixes corresponding the 0 and 1 values at that position are associated with the next node traversed down the trie, as shown in step 64. Each node resulting from split step 64 is checked to determine whether the prefixes within that node are less than or equal to a threshold T number of prefixes, as shown by decision block 66. If so, then the split operation terminates and proceeds to the end step 74. If not, the next binary value is checked 68 and the prefixes associated with the next pair of nodes is split again, as shown by step 70. The number of prefixes within each of the resulting nodes is then checked by decision block 72 to see whether that number is less than or equal to the threshold number T. If so, then the split phase will terminate. If not, then the steps 68-72 will be repeated, similar to steps 62-68, until all nodes yield a prefix number less than or equal to threshold T. The following pseudo-code represents the split phase of the splitting program, with spear entry ("SE") indicating a pointer to the node containing a bounded number of prefixes (i.e., a sub-database), where Tsplit equals T:

---

Algorithm Split(R, Tsplit)
ListPending = {R}
While (ListPending is non-empty)
{
  Remove node A from ListPending
  n = |subtrie(A)|

-continued

```
    If (n > Tsplit) {
    /* split A */
    Put A's left child (if non-null) and right child (if non-null) in
       ListPending}
    }
    else {mark node A as a candidate-SE}
    /* end of Algorithm Split( ) */
```

FIG. 7 illustrates the merge phase of the splitting program, beginning with a step after the split operation is terminated 74. The merge phase begins at step 76 by looking at each of the nodes containing prefixes that have been split. If a node contains prefixes that are less than T/2, for example, then that node must be merged upward as shown by decision block 78. If, however, each node contains prefixes that exceed the minimum threshold T/2, for example, then the merge operation will terminate as shown by step 84. Otherwise, the merge operation proceeds to step 80. Decision tree 78 is repeated for the next successive node, as shown by decision tree 82, until all prefix number within all nodes are checked to ensure those prefixes are not less than the minimum boundary. Eventually, all nodes will be checked and the merge operation will terminate. The pseudo-code representing the merge operation, where Tmerge equals T/2 in the example which follows:

```
Algorithm MergeUsingRecursion(R, Tmerge)
L = RecurseMerge(R, Tmerge);
If (L is non-empty[i.e., non-zero]) make R an SE and L its LSN.
/* end of Algorithm Merge UsingRecursion */
/* The following recursive function is used in the above algorithm. -Please
remove all instances of [ ] since they are not relevant in this context */
Function List[int] RecurseMerge(A, Tmerge)
{
If (A is NULL) return NULL[0];
If (A is already marked candidate-SE)
{
    if (|subtrie(A)| ≧ Tmerge) {mark A as an SE; return NULL[0];}
    else {return A[1];}
}
L1 = RecurseMerge(A->leftChild, Tmerge);
L2 = RecurseMerge(A->rightChild, Tmerge);
L = L1 + L2; /* list concatenation operation [or integer addition
operation in the case of ints]*/
If (A has a prefix) {ret = ({A}+L) [1+L]}
else {ret = L;}
if (ret ≧ Tmerge)
{
    /* guaranteed that ret <= 2*Tmerge-1, which is <= T if Tmerge =
    [T/2]*/
    mark A as an SE, and L its LSN;
    return NULL [0];
}
else return (ret);
/* end of algorithm RecurseMerge( ) */
```

Once the splitting program has completed the split and merge phases and the pointer table and lookup table are appropriately written to and populated, a lookup operation can proceed. If no match is found in decision block 96, one has to take the precomputed longest-match-so-far stored along with the pointer obtained in block 94. FIG. 8 illustrates one way in which a lookup can proceed by taking useful action during both the pointer lookup and the sub-database lookup. Making T larger would reduce the number of sub-databases within the forwarding database. T can be set at any value desired in order to achieve a particular prefix matching characteristic, such as higher search speed, lower storage requirement, lower preprocessing time, and lower update time. Adjustments to T can, therefore, render scalability and flexibility to the search mechanism while assuring a worst-case search.

A lookup begins at step 90 and proceeds by performing a longest-matching prefix search in the pointer table, as shown by step 92. The pointer which results from the longest prefix match will then be chosen to point to a particular sub-database, as shown by step 94. The selected sub-database then undergoes a longest-matching prefix search to determine a prefix that matches the prefix of the incoming address, as shown by step 96. Once a match occurs, then the lookup operation is terminated for that address, as shown by step 98.

The mechanism for performing a longest-matching prefix operation in the pointer table, followed by a longest-matching prefix in the sub-database can result from a masking operation, beginning with a more significant bit position and proceeding down the binary pattern to a lesser significant bit position. The mask length can, therefore, be decimated or reduced until a match occurs. It is contemplated that any form of masking might be used, as well as any well-known longest prefix matching technique, all of which are encompassed in blocks 92 and 96 of FIG. 8.

In the foregoing specification, the invention has been described with reference to specific embodiments thereof. It will, however, be evident to one skilled in the art that various modifications and changes may be made thereto without departing from the broader spirit and scope of the invention. The specification and drawings are, accordingly, to be regarded in an illustrative rather than a restrictive sense.

What is claimed is:

1. A method of forming a forwarding database for routing packets of data in a communication network, the method comprising:
    splitting N number of prefixes within the database, based exclusively on values of one or more unmasked bits within the prefixes, into a number of sub-databases bounded proportional to N and inversely proportional to T, and wherein each sub-database has no more than T number of prefixes, with T being a predetermined value less than N, and at least one of the sub-databases having more than one prefix; and
    forming a first set of pointers wherein each of the first set of pointers points to a respective one of the sub-databases.

2. The method as recited in claim 1, wherein said splitting comprises, beginning with the most significant bit of the N number of prefixes, repeatedly splitting the N number of prefixes to form a tree extending between a root node and a plurality of leaf nodes, wherein each leaf node has no more than T number of prefixes.

3. The method as recited in claim 2, further comprising merging a first leaf node having fewer than a minimum number of prefixes into a second leaf node that is arranged closer to the root node than the first leaf node.

4. The method as recited in claim 3, wherein the minimum number of prefixes is T/2.

5. The method as recited in claim 3, wherein the number of sub-databases is bounded between N and (2N/T)+1.

6. The method as recited in claim 1, wherein said forming comprises, beginning with the most significant bit of the N number of prefixes, adding bit values of lesser significant bits until the most significant bit of each sub-database is reached.

7. The method as recited in claim 1, further comprising arranging each of the sub-databases into separate blocks or portions of a computer readable storage medium.

8. The method as recited in claim 1, further comprising arranging each of the sub-databases into separately accessible portions of the same physical block.

9. The method as recited in claim 1, further comprising recursively forming a second set of pointers in the interim between the first set of pointers and the sub-databases that are pointed to by the first set of pointers and that point to the corresponding one of the sub-databases.

10. A lookup table stored in a computer-readable storage medium and construed in according to the method as recited in claim 1.

11. A computer or application specific integrated circuit (ASIC) resident in a router or switch, a line card of an input/output port of the router or switch, or the switch fabric of the router or switch, for executing the method as recited in claim 1.

12. A computer-readable storage medium bearing instructions which, when executed by a processing entity, causes the processing entity to:

split N number of prefixes within the database, based exclusively on values of one or more unmasked bits within the prefixes, into a number of sub-databases bounded proportional to N and inversely proportional to T, and wherein each sub-database has no more than T number of prefixes, with T being a predetermined value less than N, and at least one of the sub-databases having more than one prefix; and form a first set of pointers wherein each of the first set of pointers points to a respective one of the sub-databases.

13. The computer-readable storage medium as recited in claim 12 wherein the instructions which cause the processing entity to split N number of prefixes within the database into a number of sub-databases cause the processing entity to begin with the most significant bit of the N number of prefixes and repeatedly split the N number of prefixes to form a tree extending between a root node and a plurality of leaf nodes, wherein each leaf node has no more than T number of prefixes.

14. The computer-readable storage medium as recited in claim 13 further comprising instructions which, when executed by the processing entity, cause the processing entity to merge a first leaf node having fewer than a minimum number of prefixes into a second leaf node that is arranged closer to the root node than the first leaf node.

15. The computer-readable medium as recited in claim 14 wherein the minimum number of prefixes is T/2.

16. The computer-readable medium as recited in claim 14 wherein the number of sub-databases is bounded between N and (2N/T)+1.

17. The computer-readable storage medium as recited in claim 12 wherein the instructions which cause the processing entity to form a first set of pointers, cause the processor to begin with the most significant bit of the N number of prefixes and add bit values of lesser significant bits until the most significant bit of each sub-database is reached.

18. The computer-readable storage medium as recited in claim 12 further comprising instructions which, when executed by the processing entity, cause the processing entity to arrange each of the sub-databases into separate portions of a data storage.

19. The computer-readable storage medium as recited in claim 12 further comprising instructions which, when executed by the processing entity, cause the processing entity to arrange each of the sub-databases into separately accessible portions of the same physical storage block.

20. The computer-readable storage medium as recited in claim 12 further comprising instructions which, when executed by the processing entity, cause the processing entity to recursively form a second set of pointers in the interim between the first set of pointers and the sub-databases that are pointed to by the first set of pointers and that point to the corresponding one of the sub-databases.

* * * * *